June 13, 1950 W. R. CUSTER 2,510,959
AIRPLANE WITH HIGH LIFT CHANNELED WINGS
Filed April 16, 1942 2 Sheets-Sheet 2
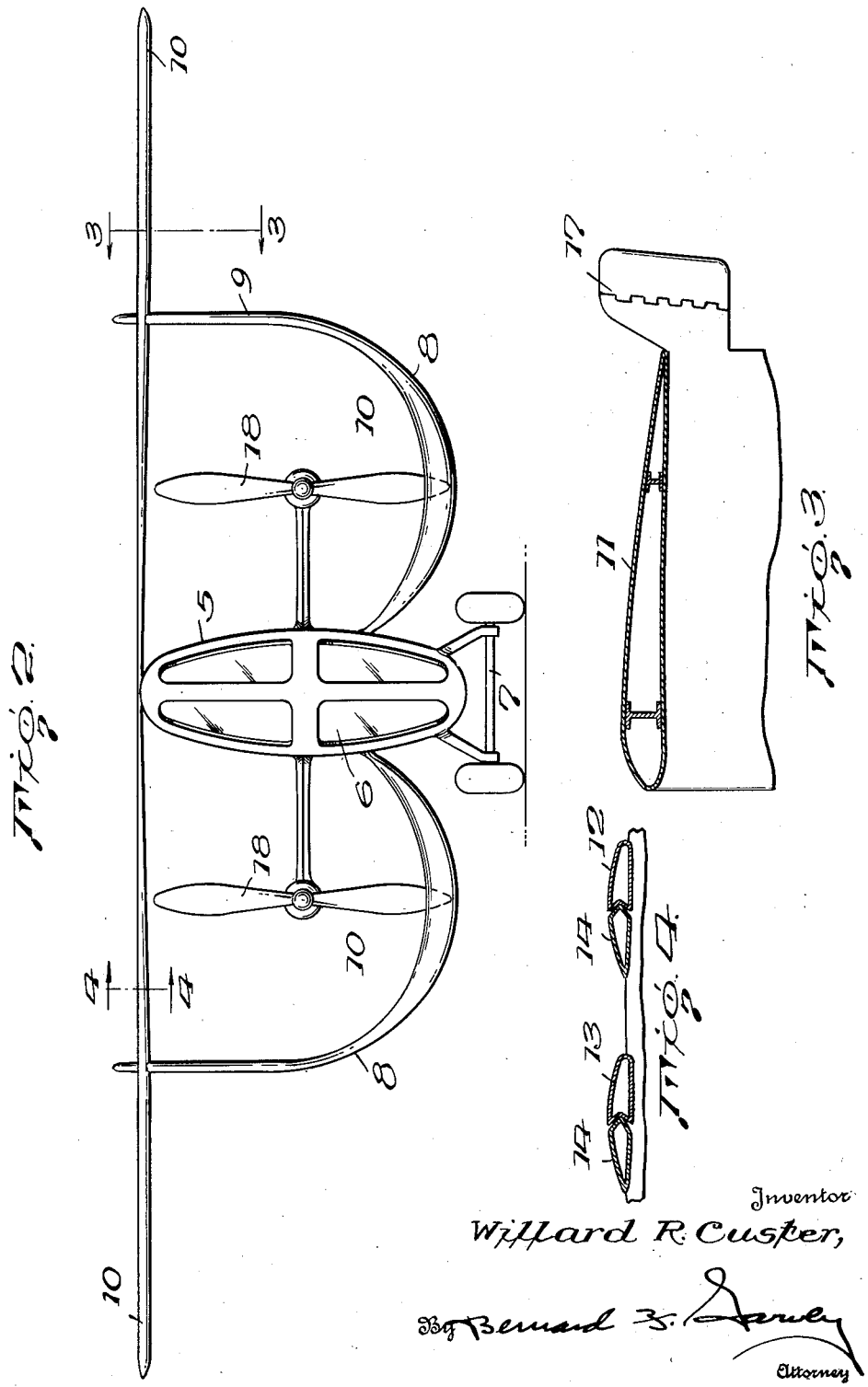
Inventor
Willard R. Custer,
By Bernard J. Hanley
Attorney Patented June 13, 1950

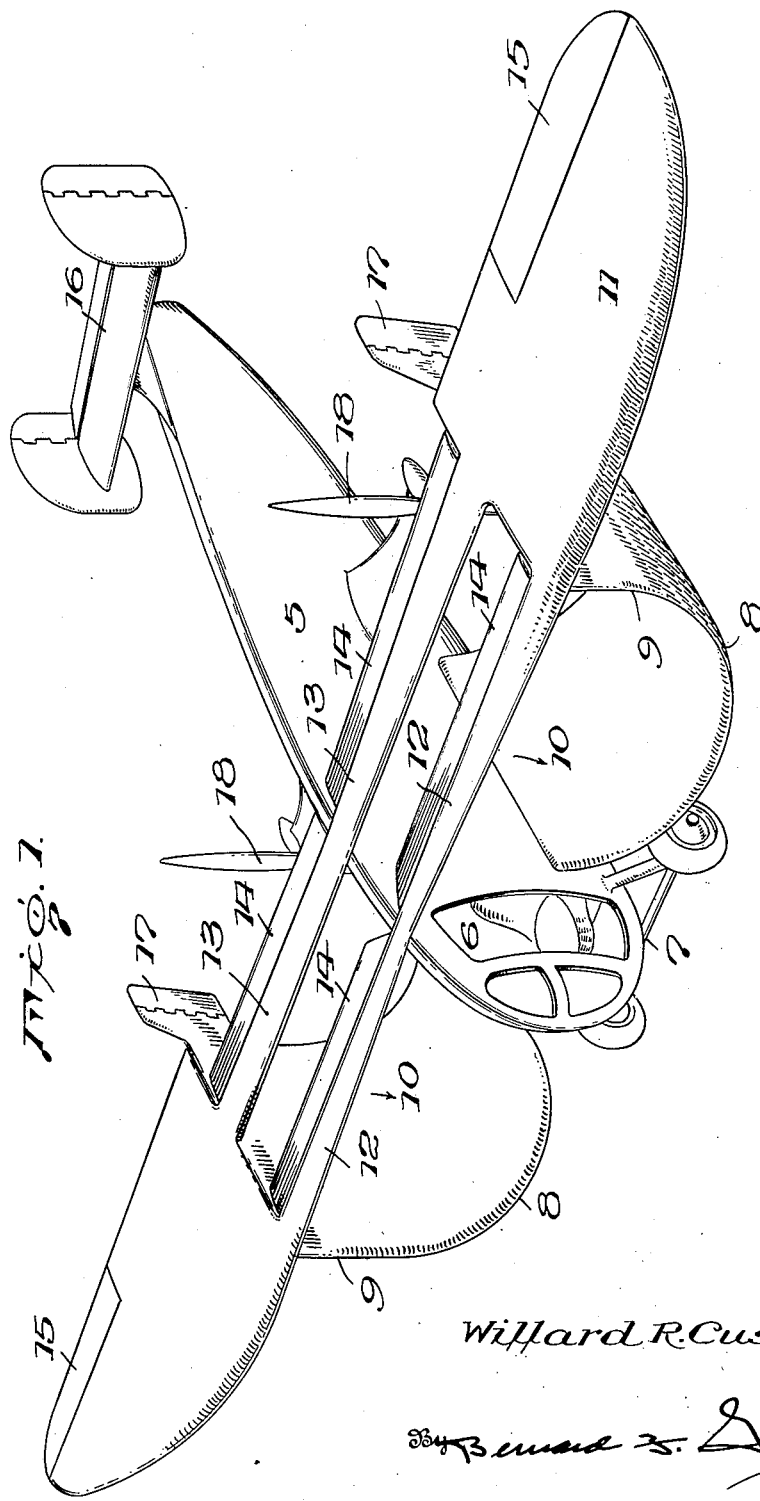

2,510,959

UNITED STATES PATENT OFFICE 2,510,959

AIRPLANE WITH HIGH-LIFT CHANNELED WINGS

Willard R. Custer, Hagerstown, Md.

Application April 16, 1942, Serial No. 439,257

3 Claims. (Cl. 244—12)

This application is a continuation in part of my application filed August 31, 1940, Serial Number 355,055, which issued as Patent No. 2,437,684, March 16, 1948, on an aeroplane having for an object to provide a modified type of wing and propeller assembly resulting in an increase in speed range ratio, permitting increased speed in flight and greatly decreased landing and take off speeds.

An object of this invention is to provide a conventional aeroplane, modified only as herein indicated, retaining maximum speeds, increasing both dynamic and static stability with decreased landing speed and accelerated lift.

It is possible to increase speed of travel in flight over presently available maximum, but landing, even under favorable field and weather conditions, is not possible. With my invention I have found it possible to increase speed to exceed any present available maximum yet permitting decrease in flight speed to a state approximating hover; without stalling or suffering altitude loss.

The increase in speed range ratio of this invention permits take off and landing, with safety, on battleship decks, aeroplane carriers, small fields, etc., without the use of added appurtenances or increased wing area, and without decreasing the maximum speed and with due regard to stabilization.

With the present invention, instead of cutting off the engine for landing, the full horsepower is utilized, the propeller, during this period, producing lift at the expense of forward motion.

Fig. 1 is a perspective view of an aeroplane constructed in accordance with the present invention, Fig. 2 is a front elevational view of the same, Fig. 3 is a fragmentary vertical sectional view of the wing, taken on the line 3—3 of Fig. 1, looking in the direction of the arrows, and Fig. 4 is a fragmentary vertical sectional view of the wing taken on the line 4—4 of Fig. 2, looking in the direction of the arrows.

My invention comprises a fuselage 5 which may be of standard configuration and includes a cockpit 6 preferably located at the extreme fore end of the fuselage. A landing gear 7 of conventional design depends from the bottom of the fuselage.

Extended laterally from the opposite sides of the fuselage, at the forward end of the latter, are a pair of wings 8. The wings are concaved with the outer margins thereof extended upwardly to provide fins or side walls 9 which extend in parallel relation to the fuselage 5 providing, in conjunction with said fuselage, channels or troughs 10. These channels or troughs (also now referred to as scoops) extend parallel to the long axis of the fuselage and correspondingly are co-axial to the direction of flight of the aeroplane. The walls of the channels are airfoil, being thickened at the base and gradually tapering toward their sides as illustrated to advantage in Fig. 2. In practice, I have found that good results are obtained by arranging the upper margins of the fins 9 substantially uniplanar with the top of the fuselage 5. The wings 8, in addition to said channels or troughs, may likewise include airfoil tips 11, the inner end of each of which is extended to provide front and rear spars 12 and 13 respectively, the cross section of these spars being substantially as illustrated in Fig. 4. The spars may be integral or made of two separate parts connected to the fuselage 5 at the top of the latter in a conventional manner. Extended from the rear margin of each of the spars 12 is an aileron 14. These ailerons, in conjunction with the spars 12, are mounted directly over the channels 10, the upper surfaces of the spars and ailerons being uniplanar with the upper surfaces of the tips 11. The ailerons 14, hereinafter referred to as the inboard ailerons, are adapted for the control of the aeroplane when landing at a moderate or low rate of speed. The ailerons are manipulated by push-pull or other standard controls, operated from the cockpit. The tips 11 may be equipped with outboard ailerons 15 for use in landing, when the aeroplane is coming in at a high rate of speed, the outboard ailerons being also operated by standard controls from the cockpit 8.

The aeroplane includes suitable rudders selectively positioned. A conventional rudder elevator assembly 16 may be mounted on the tail of the fuselage. Also brakes or rudders 17 may be mounted on the upper rear terminals of the fins or side walls 9.

Mounted on the sides of the fuselage 5 are propellers 18, one of which is positioned adjacent the aft terminal of each channel 10. Preferably the tips of the propellers are approximately co-extensive with the base of the outside arc of the channel and with the top of the latter, as shown in Fig. 2. I have found however from experiments, that the length of the propellers, with respect to the depth of the channel may be varied and good results obtained, the propellers also being useful for operation even when mounted completely within the channels.

In the preferred embodiment of the invention herein illustrated, the principle of operation is substantially the same as in my parent application referred to supra. The propellers 18, operated by an engine or other suitable source of energy, which is preferably mounted within the fuselage, rotate, one in a clockwise and the other in a counter-clockwise direction. Air is removed or displaced from the channels 10, by the operation of the propellers, thereby creating a low pressure area or partial vacuum in each of the channels, parallel to the long axis of the fuselage and coincident with the line of flight. This permits the atmosphere to exert its force against the wings and fuselage, facilitating and accelerating take off without any sacrifice of speed of the plane when in flight. The plane may take off at a low speed and in landing, the full force of the engine may be employed to drive the propellers, for the reasons already herein stated, producing lift at the expense of forward motion. In other words, instead of cutting off the motor and permitting it to idle during landing, operation of the engine is continued to drive the propellers. Consequently the engine, instead of being employed only for the take off and propulsion in flight, is likewise used to the extent of its horsepower for landing.

Changes of course may be made within the scope of the appended claims.

I claim:

1. An aeroplane including a fuselage equipped with a wing on each side of the fuselage, each of the wings being provided with an upwardly opening channel, the channel extending from the front to the rear edge of the wing, the depth of each channel being substantially constant from the fore to the aft edge of the wing, a propeller mounted on said aeroplane, the plane of rotation of the propeller disc being substantially in the transverse plane defined by the rear edge of the channel, the rear edge of the channel substantially coinciding with the lower half of the periphery of the propeller disc.

2. An aircraft having a lifting surface, said lifting surface being provided with an upwardly opening channel, the channel extending from the front to the rear edge of the surface, the depth of each channel being substantially constant from the fore to the aft edge of the wing, a propeller mounted on said surface, the plane of rotation of the propeller disc being substantially in the transverse plane defined by the rear edge of the channel, the rear edge of the channel generally coinciding with the lower half of the periphery of the propeller disc.

3. An aeroplane including a fuselage, wings on the fuselage, each of the wings being provided with a channel arranged in the direction of flight of the aeroplane, the channels opening upwardly and extending from the front to the rear edges of the wing, the depth of each channel being substantially constant from the fore to the aft edge of the wing, and propellers carried by the fuselage, the plane of rotation of the propeller discs being generally in the transverse plane defined by the rear edges of the channels, the distance between each propeller disc and the aft end of its corresponding channel being less than one-sixth of the diameter of the disc, the rear edge of each channel substantially coinciding with the lower half of the periphery of its propeller disc.

WILLARD R. CUSTER.

REFERENCES CITED

The following references are of record in the file of this patent:

UNITED STATES PATENTS

| Number | Name | Date |
| --- | --- | --- |
| 883,565 | Pars | Mar. 31, 1908 |
| 1,165,770 | Gallaudet | Dec. 28, 1915 |
| 1,200,512 | Matta | Oct. 10, 1916 |
| 1,727,542 | Gienger | Sept. 10, 1929 |
| 1,832,790 | Reynolds | Nov. 17, 1931 |
| 1,868,832 | Henter et al. | July 26, 1932 |
| 1,873,505 | Stipa | Aug. 23, 1932 |
| 1,943,774 | Shaw | Jan. 16, 1934 |
| 1,990,308 | Phillips | Feb. 5, 1935 |
| 2,118,052 | Odor | May 24, 1938 |
| 2,194,596 | Henter | Mar. 26, 1940 |

FOREIGN PATENTS

| Number | Country | Date |
| --- | --- | --- |
| 433,494 | France | Oct. 28, 1911 |
| 796,984 | France | Feb. 3, 1936 |
| 763,758 | France | Feb. 19, 1934 |
| 331,772 | Germany | Jan. 12, 1921 |
| 518,663 | Great Britain | Mar. 5, 1940 |